United States Patent [19]

Hagwell

[11] 4,267,646

[45] May 19, 1981

[54] TELEPHONE QUESTION AND ANSWER TRAINING DEVICE

[76] Inventor: Edward R. Hagwell, 2924 S. Central, Olympia, Wash. 98501

[21] Appl. No.: 4,350

[22] Filed: Jan. 18, 1979

[51] Int. Cl.³ .............................................. G09B 7/02
[52] U.S. Cl. .................................. 434/111; 434/219; 434/379
[58] Field of Search ............... 35/8 R, 8 A, 9 R, 9 A, 35/9 B, 6, 10, 13, 14, 22 R, 31 R, 35 R, 35 A, 35 C, 48 R; 179/81 C, 84 L, 90 A, 90 L

[56] References Cited

U.S. PATENT DOCUMENTS

| | | | |
|---|---|---|---|
| 2,973,586 | 3/1961 | Robertson | 35/8 R |
| 3,047,964 | 8/1962 | Fried | 35/14 |
| 3,154,862 | 11/1964 | Culpepper | 35/9 R |
| 3,350,793 | 11/1967 | Bushnell | 35/9 B |
| 3,477,142 | 11/1969 | Cornell et al. | 35/9 A |
| 3,660,913 | 5/1972 | Heath | 35/30 |
| 3,674,941 | 7/1972 | Guetta | 179/81 C |
| 3,715,520 | 2/1973 | Lambrou | 179/90 A |
| 3,878,623 | 4/1975 | Leff | 35/8 R |
| 3,964,179 | 6/1976 | Bennett | 35/31 R |
| 4,044,475 | 8/1977 | Fujisawa et al. | 35/6 |

OTHER PUBLICATIONS

*Touch-Me Operating and Maintenance Manual;* Atari; 1974; pp. 1–8.

*Primary Examiner*—Vance Y. Hum
*Attorney, Agent, or Firm*—Seed, Berry, Vernon & Baynham

[57] ABSTRACT

A device for training individuals, particularly children and the handicapped, in the use of a telephone. The training device may be employed in either a single telephone mode or a dual telephone mode. In the single telephone mode a primary telephone is initially programmed with a known telephone number by switching to a program mode and dialing the number with a conventional telephone dial. The telephone is then switched to a use mode and the student is asked to dial the programmed number. As each of the digits is correctly dialed a light corresponding to each digit is sequentially illuminated and an audible signal is heard. When all of the digits have been correctly dialed, an audible ring is sounded. If any of the digits is incorrectly dialed, power is removed from all of the previously illuminated lamps, and the student must once again start dialing the telephone number at the first digit. The number of digits in the telephone number can be selected to be either three or seven digits. In the dual telephone mode an extension telephone is connected to the primary telephone, and two-way communication is established when either of the telephones correctly dials a telephone number associated with the other telephone. As in the single telephone mode, correct dialing of each digit is verified by illuminating respective lamps on the primary telephone, and incorrect dialing necessitates that the dialing be repeated from the first digit.

7 Claims, 3 Drawing Figures

TELEPHONE QUESTION AND ANSWER TRAINING DEVICE

BACKGROUND OF THE INVENTION

1. Field of the Invention

This invention relates to the instructional equipment and, more particularly, to a realistically performing device for training individuals to utilize a telephone.

2. Description of the Prior Art

The importance of the telephone in today's world is well estalished. Consequently, it is important for children to be able to use the telephone at an early age, not only to facilitate day-to-day activities, but also the seek assistance in an emergency. Similar considerations also apply to mentally or physically handicapped individuals.

Attempts have been made to provide instructional equipment for training individuals to use the telephone, but such devices have been extremely limited, principally because they do not realistically simulate use of an actual telephone. For example, U.S. Pat. No. 2,973,586 issued to Robertson discloses a telephone training device in which a pair of telephones are connected to a central control console which provides dial tone, busy signal and ring output to the telephones when specific push buttons are manually actuated. Communication between the two telephones is achieved simply by picking up both telephone handsets. Thus, the Robertson training device is only capable of simulating the operation of a telephone after a telephone number is correctly dialed, but is utterly incapable of training an individual to dial a telephone number correctly.

U.S. Pat. No. 3,715,520 issued to Lambrou illustrates a telephone dialing apparatus in which a code card sequentially illuminates a lamp beneath one of the digits of the dial to indicate which digit should be dialed to enter the telephone number coded onto the card. This device, of course, does not realistically simulate an actual telephone since telephone numbers are communicated to a student either visually or orally and not be illuminating lamps positioned adjacent the correct digits.

Similarly, U.S. Pat. No. 3,878,623 issued to Leff discloses a telephone teaching device in which each of the digits is coded with a particular symbol. The student is instructed to dial a specific telephone number by inserting a strip selectively coded with the symbols into the telephone. Once again, this device does not provide realistic telephone training.

The effectiveness of conventional telephone training devices, including those discussed above, is also limited by their failure to recognize the limited attention span of children and mentally handicapped individuals. In order for a telephone teaching device to be effective, it must provide immediate reward for correctly dialing a number, yet allow a student to continue his attempts to dial the number until the number is correctly dialed. Also, the device should provide some measure of the enjoyment to the student since enjoyable learning is invariably effective learning. None of the conventional telephone training device exhibit these characteristics.

SUMMARY OF THE INVENTION

It is an object of the invention to provide a telephone training device which realistically simulates an actual telephone.

It is another object of the invention to provide a telephone training device which provides immediate gratification for correctly dialing each digit of a telephone number.

It is still another object of the invention to allow a student to repetitively attempt dialing a number until it is successfully dialed.

It is still another object of this invention to provide a telephone training device which is enjoyable to use and is thus capable of retaining a student's interest for a relatively long period.

It is a further object of the invention to provide a telephone training device which allows a great deal of flexibility in programming numbers to be dialed and selecting the length of the telephone numbers.

It is still a further object of the invention to provide a telephone training device achieving the above described objects when it is used by deaf individuals.

These and other objects of the invention are accomplished by a telephone training device which includes a memory for storing a set of known digits. The known digits are sequentially compared to a set of corresponding selected digits which are individually entered by an input means such as a conventional telephone dialing mechanism. The result of each comparison is displayed by an indicating means which preferably is audible as well as visible. Since the correctness of each digit selected by the student is immediately verified, the device provides immediate gratification for correctly dialing the telephone number. The correctness of each digit is stored in a register so that all of the indicating means are actuated as the final digit of the telephone number is correctly dialed. However, if any of the digits is incorrectly dialed the register means is reset and the student must repeat dialing the telephone number from the first digit. Thus, the telephone training device immediately notifies the student that a specific digit has been incorrectly dialed and allows the student to repetitively attempt selecting the entire number until the number is correctly entered. As the final digit is correctly selected by the student, an audible signal sounds to stimulate the ringing of an actual telephone when the number is correctly dialed. In a dual telephone training mode, a telephone number for each telephone may be entered with the other telephone, and two-way communication is established when the telephone number is correctly entered. Verification of the correctness of each digit is provided by sequentially illuminating a lamp corresponding to each digit and generating an audible signal as each digit is correctly entered. Also, selecting an incorrect digit necessitates that selection of the telephone number be repeated starting from the first digit of the number. The number of digits in the telephone number may be selected to allow dialing of a typical seven-digit telephone number or a three-digit emergency telephone number.

DETAILED DESCRIPTION OF THE INVENTION

Figure 1:
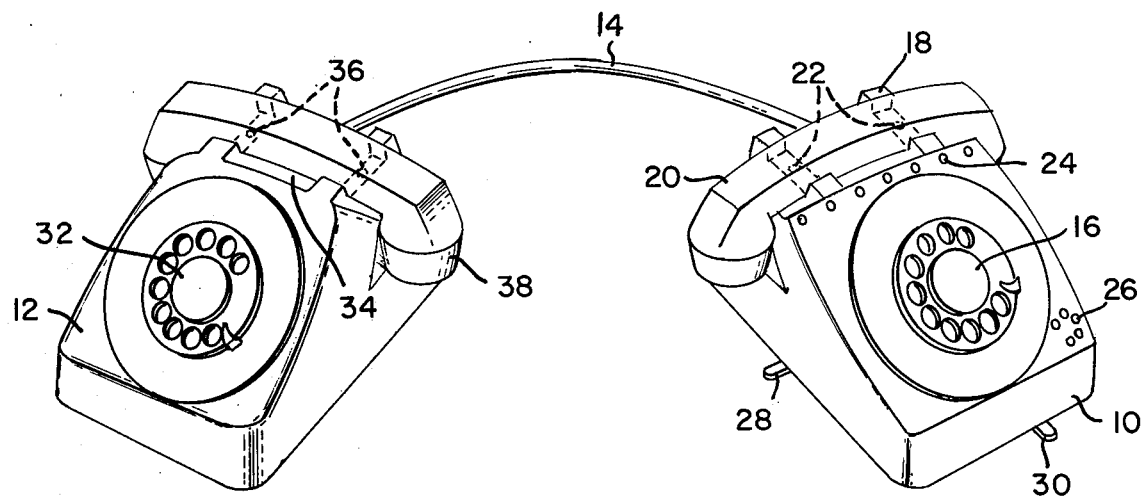
FIG. 1 is an isometric view of the telephone training device in the dual telephone mode.

The telephone training device, as illustrated in FIG. 1, includes a primary telephone 10 and an extension telephone 12 interconnected to each other by a conventional six conductor cord 14. The primary telephone 10 may be used alone in a single telephone mode or it may be used in combination with the extension telephone 12 in a dual telephone mode.

The primary telephone 10 includes a conventional dialing mechanism 16 and a cradle 18 adapted to receive a conventional handset 20 which is connected to the telephone 10 through a pair of wires (not shown). A pair of buttons 22 which project upwardly into the cradle 18 are depressed when the telephone 20 is placed on the cradle 18 to close a hook switch as explained hereinafter. The upper portion of the dial panel of the telephone 10 includes a plurality of lamps, indicated generally at 24, which, as illustrated herein, are seven in number. As explained in greater detail hereinafter, as each digit of a telephone number is correctly dialed in sequence, each of the lamps 24 are sequentially illuminated. However, if a digit is incorrectly dialed, all of the previously illuminated lamps 24 are extinguished, and dialing can only resume from the first digit. The dial panel also contains a grill 26 beneath which a speaker (not shown) is mounted. The speaker provides a ringing sound when a telephone number is correctly dialed, as explained hereinafter. A tab 28 projecting from beneath the telephone 10 at the left side thereof actuates a programming switch (not shown) which causes the number dialed to be entered into an internal memory, as explained hereinafter. A second tab 30 projects from beneath the telephone 10 at the front edge thereof for actuating a three-position function switch (not shown). As explained in greater detail hereinafter, the function switch places the training device in either a seven digit, single telephone mode in which seven digits are dialed on the telephone 10 and the telephone 10 is not connected to the extension telephone 12, a three digit, single telephone mode in which a three digit number, such as an emergency "911" number, is dialed into the single telephone or either a three digit or seven digit dual telephone mode in which the primary telephone 10 dials a three or seven digit number associated with the extension telephone 12, thereby causing the extension telephone to ring and facilitate two-way communication between the telephones 10, 12. Similarly, the extension telephone 12 may dial a three or seven digit telephone number associated with the primary telephone 10, thereby causing the telephone 10 to ring and allow two-way communication between the telephones 10, 12.

The extension telephone 12 also includes a conventional dialing mechanism 32 and a cradle 34 having a pair of buttons 36 which actuate a hook switch when a handset 38 is placed on the cradle 36. A loudspeaker (not shown) is mounted at the bottom of the telephone 12 for providing a ringing sound when the telephone number for the extension telephone 12 is dialed. The extension telephone 12 does not include a plurality of indicating lamps such as those 24 found on the primary telephone 10. However, when either telephone 10, 12 correctly dials each digit of a number associated with the other telephone 12, 10, the lamps 24 on the primary telephone are sequentially illuminated.

Figure 2A:
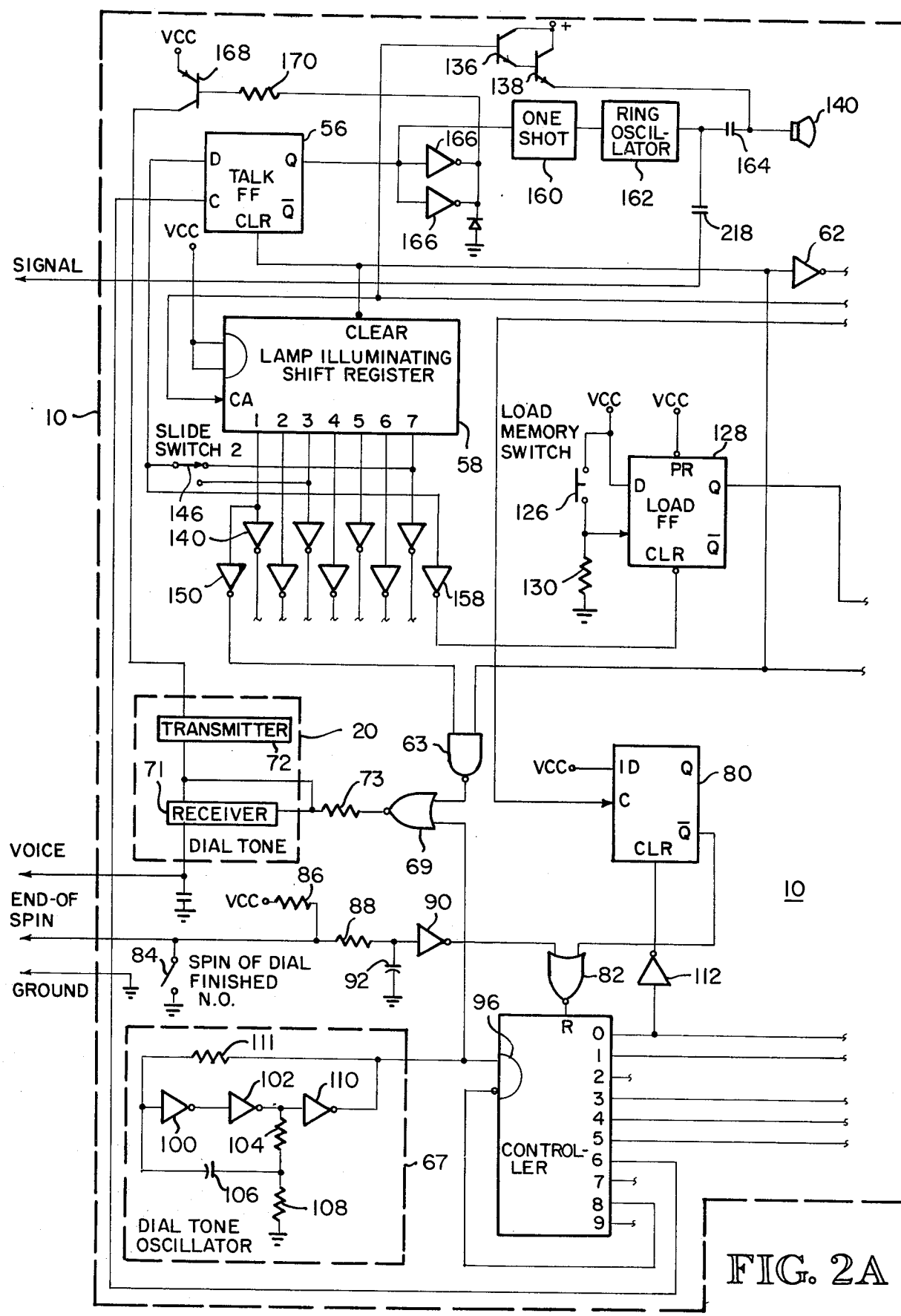
FIG. 2 is a schematic of the primary telephone.
Figure 2B:
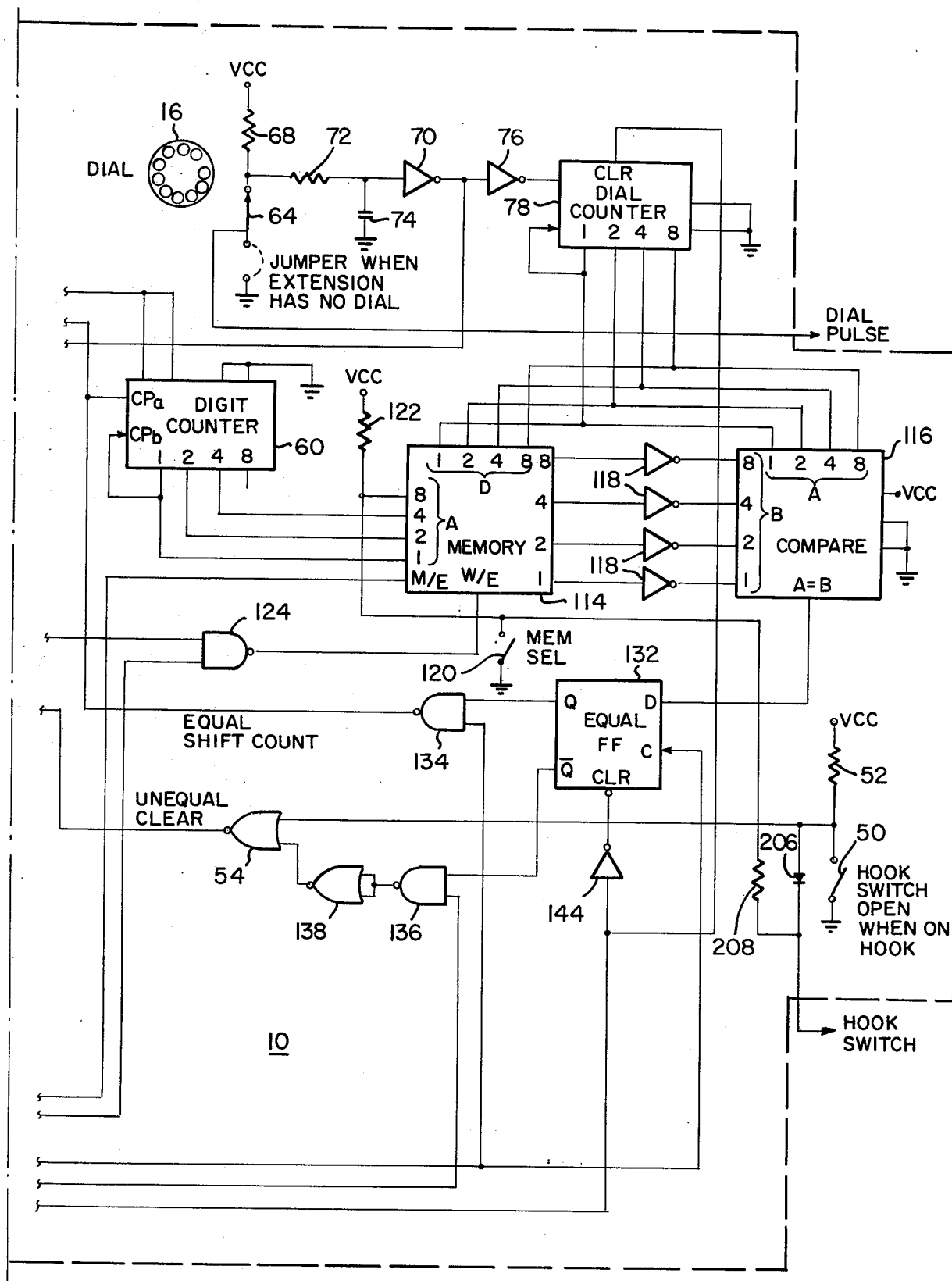

The circuitry for the primary telephone 10 is illustrated in FIG. 2. Since the primary telephone 10 can be operated alone in the single telephone mode, its circuitry and operation will initially be explained without detailed reference to the extension telephone 12. The operational sequence begins when the handset 20 (FIG. 1) is lifted from the cradle 18 which releases the buttons 22 thereby closing the hook switch 50 (FIG. 2B). One contact of the hook switch 50 is grounded while the other contact is connected to supply voltage through resistor 52. As the hook switch 50 is closed, a "0" enables NOR gate 54. However, the "1" previously applied to NOR gate 54 when the handset 20 was in the cradle 18 clears a talk flip-flop 56, lamp illuminating shift register 58 and digit counter 60 through inverter 62. Closure of the hook switch 50 also enables NAND gate 63 through NOR gate 54. Prior to dialing the first digit of a telephone number, the output of inverter 65 is also "1" so that the output of a dial tone oscillator 67 is gated through NOR gate 69 and injected into the receiver portion 71 of the handset 20 through resistor 73. However, when the first digit is either programmed or correctly dialed, NAND gate 63 is disabled to remove the dial tone from the receiver 71 as explained hereinafter.

After the handset 20 is removed from the cradle 18, the dial is rotated to a predetermined position corresponding to the desired number and released. As the dial rotates back to its at rest position, dial pulse switch 64 momentarily opens a number of times corresponding to the degree of rotation of the dial 16. One contact of the dial pulse switch 64 is connected to ground through a removable jumper 66 while the other contact is connected to the supply voltage through resistor 68 and to inverter 70 through resistor 72. A capacitor 74 is connected between the input of inverter 70 and ground to prevent the inverter 70 from responding to bounce of the switch 64. Thus, as the dial 16 rotates toward its rest position, the input to inverter 70 momentarily drops from "1" to "0" a number of times corresponding to the numbers selected on the dial 16. These pulses are inverted by inverter 76 and applied to a dial counter 78. The dial counter 78 produces a BCD output equal to the number of pulses generated by the switch 64. The pulses from the output of inverter 70 also clock a "0" to the $\overline{Q}$ output of flip-flop 80 thereby enabling NOR gate 82. When the dial 16 reaches its rest position, a spin-of-dial-finished switch 84 opens thereby allowing current to flow from the supply voltage through resistors 86, 88 to an inverter 90. A capacitor 92 is provided to prevent the inverter 90 from responding to bounce of the switch 84. When the end of spin switch 84 opens, the output of inverter 90 falls to "0" thereby resetting a conventional decade/counter/divider 94 through enabled NOR gate 82. The decade/counter/divider 94 acts as a controller to properly sequence the operation of the circuitry, and it will be referred to as a "controller" hereinafter. When the controller 94 is reset, the No. 8 output goes to "0" thereby enabling input AND gate 96 so that the output of the dial tone oscillator 67 begins incrementing the controller 94 to sequentially produce a pulse at each of the outputs. The oscillator 98 is formed by cascaded inverters 100, 102 having the output connected to the input through resistor 104, and capacitor 106 to form a positive feedback circuit. The gain of the positive feedback circuit is controlled by resistor 108. The output of the inverter 102 is connected to the AND gate 96 through inverter 110 which is also connected to the input to inverter 100 through resistor 111.

The function of the controller 94 is basically to perform a number of operations in the proper, individual sequence. During the first operational sequence when a pulse is produced at the No. 0 output, flip-flop 80 is cleared through inverter 112 thereby disabling NOR gate 82 to prevent the controller 94 from being reset until a subsequent dialing operation. The pulse at the number "0" output is also applied to the M/E (memory enable) input of a conventional memory device 114 thereby placing a previously programmed number at the output of memory 114 which is located in the address designated by the address inputs A. This number is applied to the B inputs of a comparator 116 through inverters 118. The three low order bits of the address are determined by the digit counter 60 as explained in greater detail hereinafter, while the high order bit is determined by a memory select switch 120 in the single telephone mode. In the single telephone mode the memory select switch is closed thereby making the high order bit "0". In the dual telephone mode the memory select switch 120 is normally open thereby biasing the high order bit as "1" through resistor 122, but allowing the high order bit to be made "0" by other means as explained hereinafter. Alternatively, the switch 120 may be closed in the dual telephone mode so that the high order bit is always "0" as explained hereinafter.

In the second operational sequence, the pulse at the No. 1 output is applied to NAND gate 124. If a number has not been previously programmed in the memory 114, the program tab 23 (FIG. 1) is actuated thereby closing load memory switch 126 and clocking a "1" to the Q output of flip-flop 123 and enabling NAND gate 124. The clock input to the flip-flop 128 is normally grounded through resistor 130. Thus, when the programmed tab 28 has been actuated, the pulse at the No. 1 output of the controller 94 is applied to the right enable input of the memory 114 in inverted form thereby reading the output of the dial counter into the memory location selected by the address and placing the number at the output of the memory 114. The output of the dial counter 78 is also applied to the A inputs to the comparator 116. Under these circumstances, the A inputs to the comparators equal the B inputs to the comparators so that the A=B output of the comparator 116 is "1".

During the next operation the pulse at the No. 3 output of the controller 94 clocks the output of the comparator 116 into equal flip-flop 132 and enables NAND gate 134. If the output of the comparator 116 is "1" thereby indicating that the output of memory 114 is equal to the output of the dial counter 78 the pulse at the No. 3 output of the controller 94 passes through NAND gate 134 in inverted form thereby incrementing the digit counter 60 and shifting a "1" to the No. 1 output of shift register 58. Additionally, the pulse is applied to the base of Darlington transistors 136, 138 which have their output connected to a loudspeaker 140 for producing an audible indication.

As mentioned above, the output of the memory 114 always equals the output of the dial counter 78 during the programming operation so that a pulse is always produced at the output of NAND gate 134 during the programmming operation. However, after the memory 114 has been programmed, it is possible that the digit selected by the dial 16 will not equal the digits stored in the corresponding location in memory 114 so that the output of comparator 116 will be "0". Under these circumstances the Q output of flip-flop 132 will be "0" so that a pulse will not be produced at the output of NAND gate 134. Instead, the $\overline{Q}$ output of the flip-flop 132 will be "1" thereby enabling NAND gate 136.

During the next operation a pulse is produced at the No. 4 output of the controller 94 which is applied to NAND gate 136. If NAND gate 136 has been enabled responsive to an incorrectly dialed number, a positive going pulse is generated at the output of NOR gate 138 which produces a negative going pulse at the output of NOR gate 54 thereby resetting the talk flip-flop 56, shift register 58 and digit counter 60 through inverter 62. It will be remembered that the NOR gate 54 will be enabled at this time since the hook switch 50 is open, but the same reset operation previously occurred when the hook switch 50 was closed at the start of the dialing operation. Thus, it is seen that incorrectly dialing a number causes the dialing sequence to start from the beginning again.

When a telephone number is being programmed or when a telephone number is being correctly dialed, a pulse will not appear at the output of NOR gate 54, but it will appear at the output of NAND gate 134 as explained above. When the digit counter 60 is incremented by the pulse at the output of the NAND gate 134 it generates a new address for the memory 114 which is one increment higher than the previous memory address and the "1" shifted to the first output of shift register 58 illuminates a lamp 24 (FIG. 1) connected to the output of inverter 142. A "0" is also generated at the output of inverter 65 which disables NAND gate 63 to, in turn, disable NOR gate 69 thereby removing the output of the dial tone oscillator from the receiver 71 in the handset 20. The pulse at the output of NAND gate 134 also provides an audible signal from the loudspeaker 140 to verify the correctness of the dialed digit when the training device is being used by blind individuals.

During the next operation, a pulse is generated at the No. 5 output of the controller 94 which clears the dial counter 78 and the equal flip-flop through inverter 144.

During the next operation a pulse at the No. 6 output of the controller 94 clocks the talk flip-flop 56. However, either the No. 3 or No. 7 output of the shift register 58, depending upon the position of switch 146, will be "0" so that the Q output of the talk flip-flop 56 will remain "0".

The dialing sequence can thus be summarized as follows. As the dial is rotated a predetermined number of digits, it generates a corresponding number of pulses which are counted by the dial counter 78 and applied to the memory 114. In the program mode this count is read into the first memory address and simultaneously applied to the output of the memory 114 and the A input of comparator 116. A "1" is then produced at the output of the comparator 116 which causes a pulse at the output of NAND gate 134 to increment the digit counter 60 to select the next address in memory 114 and to shift a "1" to the No. 1 output of shift register 158 thereby illuminating the first lamp 24 (FIG. 1). In the training mode the output of the dial counter 78 is compared to a predetermined number previously stored in the memory 114. A "positive comparison", i.e. where the A input to the comparator 116 equals the B input to the comparator 116, causes the digit counter 60 to be incremented and the shift register 58 to be advanced as described above with respect to the programming operation. If the predetermined number stored in memory 114 is incorrectly dialed, a pulse at the output of NOR gate 54 resets the talk flip-flop 56, the shift register 58 and the digit counter 60 causing the dialing procedure to start from the beginning again.

After the first digit has been dialed, the dialing procedure is repeated again causing the above described procedure to reoccur with the digit counter 60 being repetitively incremented to select the next higher address in memory 114 and a "1" is shifted an additional output in shift register 58 thereby illuminating an additional lamp 24. The dialing procedure terminates when the seventh digit is either programmed or correctly dialed when the switch 146 is in the position illustrated, or when the number 3 digit is programmed or correctly dialed when the switch 146 is in the other position. At that time the "1" at the output of the shift register 58 clears the load memory flip-flop 128 through inverter 158, and the "1" is clocked to the Q output of the talk flip-flop 56. The "0" to "1" transition at the output of the talk flip-flop 56 triggers one-shot 160 to enable a ring oscillator 162 for a predetermined period which is applied to the speaker 140 through capacitor 164. The oscillator 162 simulates the ring conventionally heard when a number is correctly dialed. The "1" at the output of the flip-flop 56 also causes a "0" to be produced at the output of inverters 166 causing current to flow through the emitter-base junction of transistor 168 through resistor 170. Power is then applied to a transmitter 172 and the receiver 71 of the handset 20. In the single telephone mode this operation is of no importance since two-way communications are not possible. However, in the dual telephone mode, as explained hereinafter, the power applied to the handset 20 by transistor 168 allows two-way communication between the primary telephone 10 and the extension telephone 12. This two-way communication can continue indefinitely until the handset 20 is placed on the cradle 18 at which time the hook switch 50 is opened thereby generating a "0" at the output of NOR gate 54. This "0" clears the talk flip-flop 56 thereby removing power from the handset 20, it clears the shift register 58 thereby removing power from the lamps 24 and isolating the dial tone oscillator 67 from the receiver 71 and it resets the digit counter 60 through inverter 62. The device is then in condition to be either programmed with a new number or the previously programmed number can be dialed once again.

Although the system illustrated herein utilizes a conventional dialing mechanism 16 to enter numbers, it will be understood that a conventional touch tone device can also be used. In this case the output of the touch tone device would be received by a conventional converter which generates a series of pulses corresponding in number to the number identified with the selected push button. The output of the converter would then be connected to the dial counter 78 and to the clock input of the flip-flop 80.

Figure 3:
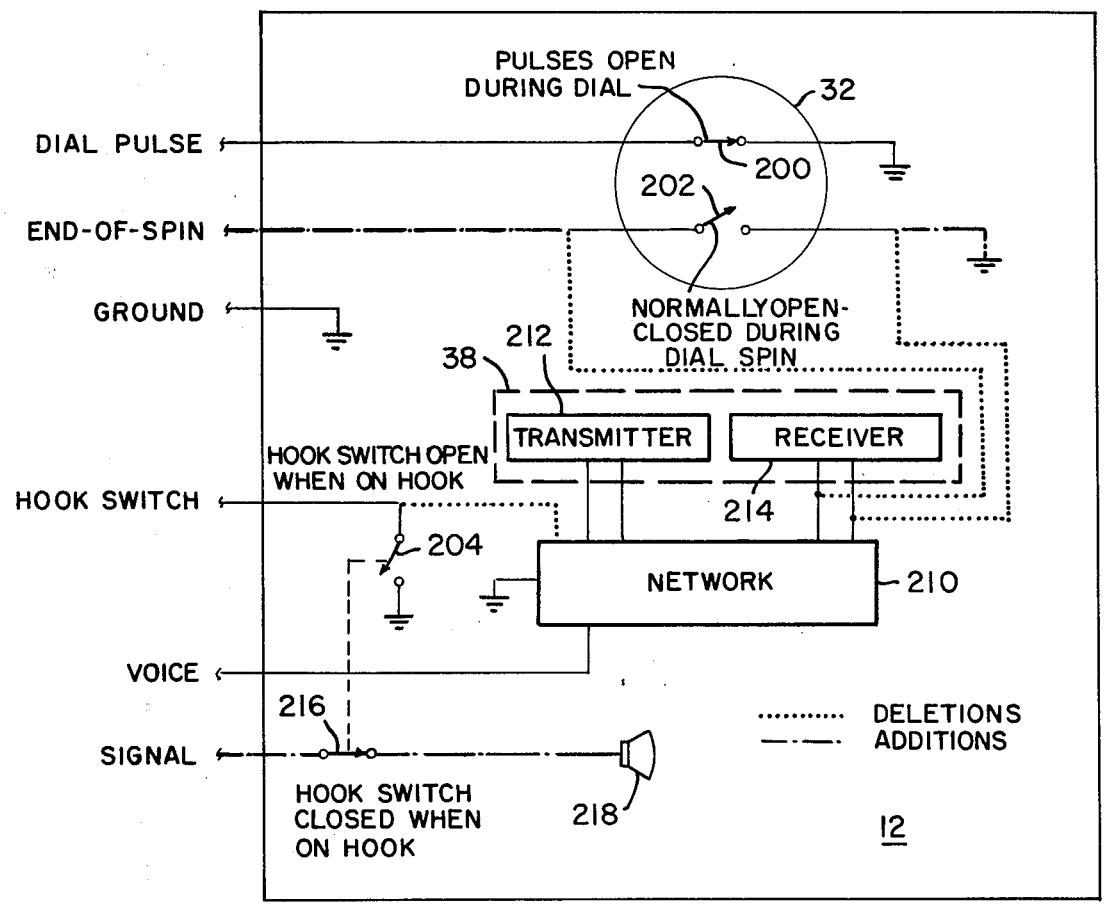
FIG. 3 is a schematic of the extension telephone.

The circuitry for the extension telephone is illustrated in FIG. 3. Basically, the extension telephone 12 is a conventional telephone modified by deleting the wires illustrated in dots and adding wires illustrated in dashes. The dial 32 of the extension telephone 12 also includes a dial pulse switch 200 corresponding to the dial pulse switch 64 of the primary telephone 10 which is placed in series with the dial pulse switch 64 after the jumper 66 is removed. The jumper 66 is preferably formed with a conventional plug receptacle so that when a plug (not shown) connected to the extension telephone 12 is plugged into the primary telephone 10, the jumper is automatically removed. Since the dial pulse switch 200 for the extension telephone 12 is in series with the dial pulse switch 64 for the primary telephone 10, it produces dial pulses in the same manner as the switch 64 which are counted by the dial counter 78 as described above.

The dial 32 for the extension telephone 12 also includes an end of spin switch 202 corresponding to the switch 84 in FIG. 2. This switch 202 is placed in parallel with the switch 84 so that the input to inverter 90 is grounded if either of the dials 16, 32 are being utilized to enter a digit into the dial counter 78.

This extension telephone 12 also includes a hook switch 204 which corresponds to the hook switch 50 in FIG. 2. The hook switch 204 is connected to the cathode of a diode 206 (FIG. 2) and the high order bit of the address input of memory 114 through resistor 208. Thus, when the hook switch 50 is closed, a "0" is applied to NOR gate 54, but the "0" is not applied to the high order bit of the memory address since the diode 206 is back biased. However, when the hook switch 204 for the extension telephone 12 is closed, a "0" is applied to the NOR gate 54 through the diode 206 and to the high order bit of the memory address through resistor 208. Thus, when either handset 20, 38 is removed from its respective cradle 18, 36 a "0" is applied to NOR gate 54, but a "0" is applied to the high order bit of the memory address only when the handset 38 for the extension telephone 12 is removed from its cradle 36. It will be remembered that in the dual telephone mode the memory select switch 120 is normally open so that the voltage level of the high order bit is determined by the voltage at the cathode of the diode 206. In this manner two separate telephone numbers corresponding to the primary and extension telephones, respectively, can be programmed in memory. Alternatively, the memory select switch may be closed so that both telephones 10, 12 can dial each other on the same telephone number.

The telephone number for the primary telephone 10 is programmed by actuating the program tab 28, lifting the handsets 38 for the extension telephone 12 off its cradle 36 and entering a telephone number with the dial 32 as described above with respect to the single telephone mode. Since the hook switch 204 is closed, a "0" is applied to the high order address bit of the memory 114 so that the telephone number for the primary telephone 10 is stored in a low set of addresses. The telephone number for the extension telephone is programmed by actuating the programming tab 28, lifting the handset 20 from its cradle and entering a telephone number with the dial 16. Since the hook switch 204 is open at this time and the "0" produced by closed switch 50 is blocked by diode 206, the high order address bit of the memory 114 is "1" so that the telephone number for the extension telephone 12 is stored in a higher set of addresses. The testing device can then be utilized in the same manner as described above with respect to the single telephone operation. The extension telephone dials the primary telephone by lifting its receiver thereby selecting the telephone number for the primary telephone's number stored in the lower set of addresses. As each digit is correctly dialed, the lamps 24 on the primary telephone 10 are sequentially illuminated until the final digit has been correctly dialed as determined by the position of the switch 146 thereby applying power to the handset 20 through transistor 168. The transmitter 172 and receiver 71 of the handset 20 is wired in series with a conventional network 210 communicating with the transmitter 212 and receiver 214 in the handset 38 of the extension telephone 12 so that two-way communication is established between the primary telephone 10 and extension telephone 12. This two-way communication continues until both of the handsets 20, 38 are placed on its respective cradle 18, 34 thereby closing respective hook switches 50, 204 and disabling NOR gate 54 which resets the talk flip-flop 56.

The extension telephone 12 is dialed by lifting the handset 20 from its cradle 18 and dialing the number corresponding to the extension telephone on the dial 16 of the primary telephone 10. Since the hook switch 204 is open and the diode 206 prevents the hook switch 50 from grounding the high order address bit of the memory 114 the extension telephone number stored in the higher set of addresses is compared to the output of the dial counter.

When the number for either the primary telephone 10 or the extension telephone 12 has been programmed or is correctly dialed, the output of the ring oscillator 162 is applied to one contact of a normally closed hook switch 216 (FIG. 3) through a capacitor 218 (FIG. 2). When the handset 38 for the extension telephone 12 is in its cradle 36, the hook switch 216 is closed thereby applying the output of the oscillator to a conventional loudspeaker 218 to simulate the ringing of the extension telephone. However, when the extension telephone is dialing the telephone number for the primary telephone 10, the hook switch 216 is open so that the ring signal is not applied to the speaker 218.

It is thus seen that in either the single or dual telephone modes the telephone training device provides realistic simulation of actual telephone use.

I claim:

1. A telephone training device, comprising:
   memory means for storing a set of known digits;
   a primary telephone having first input means for sequentially selecting a set of digits corresponding in number to the number of digits in said set of known digits;
   comparator means for sequentially comparing each of said selected digits to a corresponding known digit;
   indicating means receiving the output of said comparator means for sequentially indicating the result of each set of said comparisons;
   register means for storing the results of each of said comparisons such that the results of said comparisons are continuously indicated as subsequent digits are selected;
   reset means for clearing the results of said comparisons from said register means responsive to a negative comparison between a selected digit and a corresponding known digit;
   first audio indicating means actuated as each digit is selected by said input means and positively compared to its corresponding known digit; and
   second audio indicating means actuated responsive to the final digit being selected by said input means and positively compared to its corresponding known digit.

2. A telephone training device, comprising:
   a primary telephone having a handset and first input means for sequentially entering a first set of selected digits;
   an extension telephone having a handset and second input means for sequentially entering a second set of selected digits;
   memory means having a data bus on which one of a plurality of known digits is presented from a memory location determined by an address on an address bus;
   a digit counter for counting the number of digits which have been entered by said first and second input means, the output of said counter being connected to a first portion of said address bus so that a different known digit from a different memory address is selected for each digit to be entered;
   control means for applying one address to another portion of said address bus when the handset of said primary telephone is off hook, and for applying a different address to said other portion of said address bus when the handset of said extension telephone is off hook such that a first set of known digits is presented to said data bus when said primary telephone handset is off hook and a second set of known digits is presented to said data bus when said extension telephone handset is off hook;
   comparator means for comparing the digit on the data bus of said memory means with the selected digit being entered;
   first indicator means for indicating the result of each of said comparisons; and
   second indicator means actuated responsive to all of the digits in a set of selected digits being entered and positively compared to corresponding known digits on the data bus of said memory means.

3. The training device of claim 2 further including register means for storing the results of each of said comparisons such that the results of said comparisons are continually indicated by said first indicating means as subsequent selected digits are inputed.

4. The telephone training device of claim 3 further including reset means for clearing the results of said comparisons from said register means responsive to either a reset signal or a negative comparison between a selected digit and a corresponding known digit.

5. The training device of claim 2 wherein each of said telephones further include respective transmitter and receiver devices with the transmitter device of said primary telephone being selectively connected to the receiver device of said extension telephone by switching means, and the transmitter device of said extension telephone being selectively connected to the receiver device of said primary telephone by switching means, and means for enabling said switching means to close said connections responsive to all of said selected digits being entered by said input means and positively compared to their corresponding known digits.

6. A telephone training device, comprising:
   a primary telephone having a handset, a hook switch actuated by movement of said handset with respect to said telephone and first input means for sequentially entering a first set of selected digits;
   an extension telephone having a handset, a hook switch actuated by movement of said handset with respect to said telephone and second input means for sequentially entering a second set of selected digits;
   memory means having a data bus for storing in a first memory location a first set of known digits corresponding in number to the number of digits in said first set of selected digits, and for storing in a second memory location a second set of known digits corresponding in number to the number of digits in said second set of selected digits;
   control means for sequentially presenting each digit of said first set of known digits at the data bus of said memory means as each digit of said first set of said selected digits is entered and for sequentially presenting each digit of said second set of known digits at the data bus of said memory means as each digit of said second set of selected digits is entered, said control means including an address input to said memory means for selecting between said first and second memory locations, said hook switches being operatively connected to said address input for presenting data in said first memory location to said data bus when the hook switch of said primary telephone is actuated and for presenting data in said second memory location to said data bus when the hook switch of said extension telephone is actuated;

comparator means for comparing the digit on the data bus of said memory means with the selected digit being entered; register and indicating means for storing and indicating the results of each of said comparisons such that the results of said comparisons are continuously indicated by said first indicating means as subsequent digits are selected;

second indicator means actuated responsive to all of the digits in a set of selected digits being entered and positively compared to corresponding known digits on the data bus of said memory means; and reset means for clearing the results of said comparisons from said register means responsive to either a reset signal or a negative comparison between a selected digit and a corresponding known digit, said reset signal being generated responsive to the potential of a circuit node being substantially above ground potential and wherein one contact of each hook switch is connected to ground potential with the other contact of the primary telephone hook switch connected to said circuit node and the other contact of the other hook switch connected to said address input and to the cathode of a diode having its anode connected to said circuit node such that actuation of both hook switches in an open position allows said circuit node to be substantially above ground potential thereby generating said reset signal while actuation of either hook switch places the potential of said circuit node at substantially ground potential, and actuation of the primary telephone hook switch in a closed position allows the potential of said address input to be substantially above ground potential thereby causing said memory means to select said first memory location and actuation of the extension telephone hook switch in a closed position places the potential of said address input at ground potential thereby causing said memory means to select said second memory location.

7. A telephone training device, comprising:

memory means for storing first and second sets of known digits;

a primary telephone having first input means for sequentially selecting a first set of digits corresponding in number to the number of digits in said first set of known digits, first audio signaling means for producing an audible tone responsive to a first actuating signal, a receiver device and a transmitter device;

an extension telephone having second input means for sequentially selecting a second set of digits corresponding in number to the number of digits in said second set of known digits, second audio signaling means for producing an audible tone responsive to a second actuating signal, a receiver device and a transmitter device;

comparator means connected to said memory means and said first and second input means for sequentially comparing each digit of said first set of selected digits to a corresponding digit of said first set of known digits and for sequentially comparing each digit of said second set of selected digits to a corresponding digit of said second set of known digits;

indicating means receiving the output of said comparator means for sequentially indicating the result of each of said comparisons;

first audio signaling means for generating said first actuating signal responsive to all of said second set of selected digits being positively compared to their corresponding digits in said second set of known digits;

second audio signaling means for generating said second actuating signal responsive to all of said first set of selected digits being positively compared to their corresponding digits in said first set of known digits; and switching means for establishing communication between the transmitter device of said primary telephone and the receiver device of said extension telephone, and between the transmitter device of said extension telephone and the receiver device of said primary telephone responsive to all of said selected digits being entered by either of said input means and positively compared to their respective known digits.

* * * * *